United States Patent [19]
Crima

[11] Patent Number: 5,694,990
[45] Date of Patent: Dec. 9, 1997

[54] VEHICLE OIL FILTER DRAIN BOOT

[76] Inventor: Michel G. Crima, 184 Hawthorne Rd., Kings Park,, N.Y. 11754

[21] Appl. No.: 680,626

[22] Filed: Jul. 17, 1996

[51] Int. Cl.[6] ........................................ B67C 3/00
[52] U.S. Cl. ................ 141/330; 141/98; 141/364; 141/375; 222/85
[58] Field of Search .................. 222/81, 83, 835, 222/86, 85, 88; 141/330, 364, 98, 375; 184/106, 1.5

[56] References Cited

U.S. PATENT DOCUMENTS

| | | | |
|---|---|---|---|
| 3,519,167 | 7/1970 | Rast | 222/85 |
| 3,926,339 | 12/1975 | Openchowski | 222/85 |
| 4,177,529 | 12/1979 | Sikula, Jr. | 141/330 |
| 5,249,708 | 10/1993 | Magness | 222/83 |
| 5,253,684 | 10/1993 | Sternheimer | 141/329 |
| 5,299,714 | 4/1994 | Kilgore | 222/81 |
| 5,390,823 | 2/1995 | Kilgore | 222/81 |

FOREIGN PATENT DOCUMENTS 844379  6/1970  Canada .................. 222/85

*Primary Examiner*—Philippe Derakshani
*Attorney, Agent, or Firm*—Alfred M. Walker

[57] ABSTRACT

A flexible, hollow puncture and drainage boot for insertion of an oil filter therein. The puncture and drainage boot includes a ledge member upon which an end wall of a vehicle oil filter is placed, to provide a cavity space between an end base member of the drainage boot and the bottom of the oil filter for drainage of fluid therefrom, through at least one hole produced by a piercing of the oil filter. The drainage boot further includes an exit conduit for drainage of oil therefrom.

19 Claims, 2 Drawing Sheets

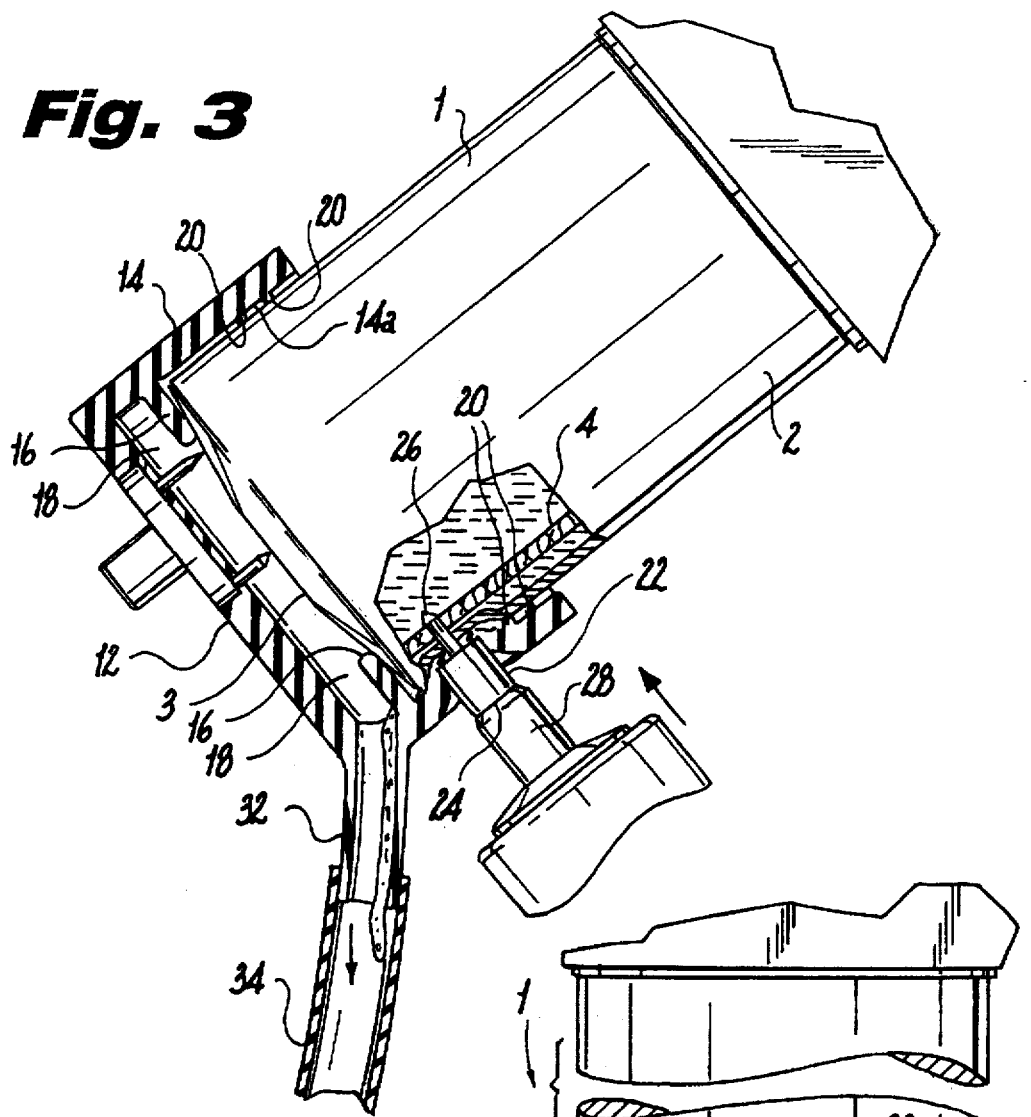
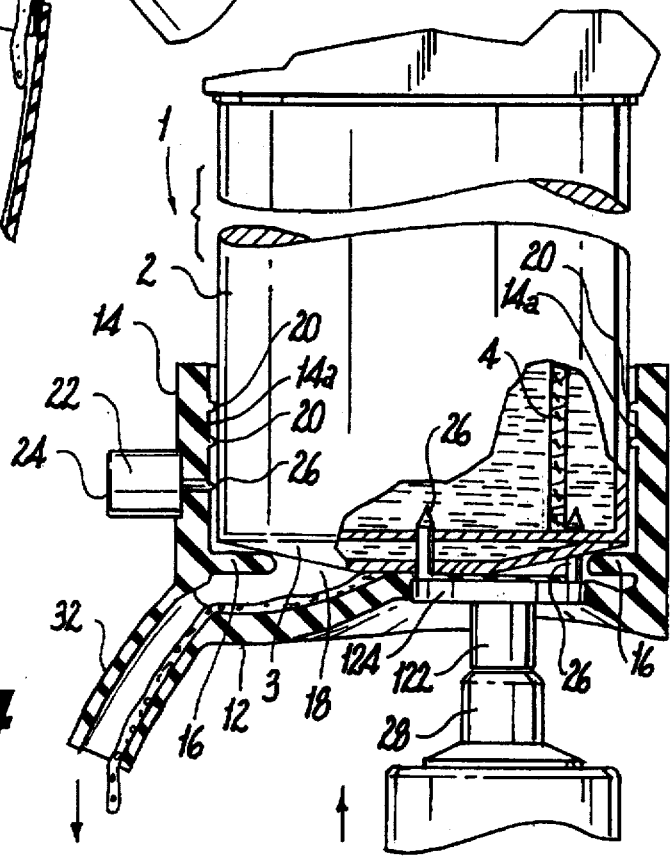

VEHICLE OIL FILTER DRAIN BOOT

FIELD OF THE INVENTION

The present invention relates to a vehicle oil filter puncture and drain device.

The device includes a flexible boot insertable over an end portion of a typical automobile oil filter. The boot has at least one puncture member installed within the walls of the boot, so that upon the application of manual or otherwise force against at least one puncture member, the puncture members can extend either axially into an end of the oil filter or transversely against the cylinder of the wall of the oil filter, depending on the position of the access to the oil filter within the engine compartment of the automobile.

BACKGROUND OF THE INVENTION

Oil filters for automobiles and other vehicles are difficult and messy to remove by nature of their open end. When they are removed from the engine compartment, they leak oil on to the other adjacent engine parts and also on to the ground creating a difficult condition for cleaning.

Among the prior art for oil filters include U.S. Pat. No. 5,299,714 of Kilgore and 5,390,823 also of Kilgore for oil filter hand punch and drain means. In Kilgore '714 the device includes a hollow puncture tube, which is inserted the wall of the oil filter so that the oil filter can drain the oil through the hollow tube. Kilgore '823 is a similar device with a valve at the bottom. In both Kilgore '714 and '823 the oil is suppose to drain through the puncture members, however, what is lacking and deficient in Kilgore '714 and '823, is that at the site of the puncture, some of the oil will go into the hollow tube. However, some of the oil will drip on the outside of the hollow tube because the puncture element does not provide a seal at the end. Therefore, a considerable volume of oil will also leak outside of the hollow tube to the detriment of the cleaning process.

Other drain cleaning dispensers including puncture elements are noted in U.S. Pat. No. 5,253,684 of Sternheimer et al. and U.S. Pat. No. 5,249,708 of Magness for drain types.

None of the prior art patents includes a removable boot into which can be inserted the end of the oil filter, wherein the boot is flexibly engaged at the cylindrical end of the oil filter and wherein the puncture members are easily applied against either a transverse cylindrical wall or an axially extending end wall of the oil filter, so that all of the oil can be drained into a reservoir located within the interior of the boot and thereafter out of the boot through a drainage conduit.

OBJECTS OF THE INVENTION

It is therefore an object of the invention to provide a drainage boot with at least one puncture member built-in for an oil filter, which puncture member engages an oil filter while the boot seals the oil filter during drainage of oil therefrom.

It is also an object of the invention to provide a drainage boot with a plurality of built-in puncture members for engaging one of more portions of the oil filter.

It is also an object of the invention to provide a removable drainage boot which has a drainage conduit for draining oil therefrom.

It is also an object of the present invention to provide drainage boot for oil filters having a variety of access points for puncturing the oil filter.

It is also an object of the invention to improve over the disadvantages of the prior art.

SUMMARY OF THE INVENTION

In keeping with these objects and others which may become apparent, the present invention includes a flexible boot made of a particular flexible material, such a rubber or other flexible material, having a open neck end with resilient grasping members therein for engaging over the outside cylindrical wall of an oil filter.

In the boot there is a ledge for resting the edge of the oil filter so that a drainage space may be provided between the end of the oil filter and the end wall of the boot. Attached within the walls of the boot, is at least one puncture member including a puncture piercing front portion and a base member engagable with the wall of the boot.

In the preferred embodiment, there is provided a plurality of puncture members including at least one puncture member for entry of the member transversally against and through the cylindrical wall of the oil filter, and at least one puncture member located at the base of the boot for axially puncturing the base of the oil filter.

In a further embodiment, a plurality of axially oriented piercing members may be provided at the bottom of the boot so that the oil filter may be punctured at the base in more than one location.

In an optional embodiment, there is an extension tube which can lengthen the length of the outlet conduit of the boot, so that the oil may be drained to a remote pan or other dispensing means.

For ease of use, each base of the puncture members includes a hollow portion into which is insertable a conventional ratchet head attached to a handle so that the force may be applied against the piercing member and into the walls of the oil filter.

In another embodiment, the handle member may have a plurality of ratchet extension members for simultaneously engaging a plurality of piercing members at the base of the boot.

In operation, the piercing members must engage an outer wall of the oil filter by piercing either the transverse outer wall or the axial lower end base wall. In the case of a transversal puncture member, it must also puncture the conventional corrugated internal paper filter member within the oil filter. Such a filter member is easily tearable but its wall has a depth because of its corrugated nature, including a plurality of accordion type walls, which are folded adjacent to each other to form a cylindrical inner filter with a series of longitudinally extending ridges separated by a corresponding series of longitudinally extending depressions, which may be up to a ¼–½ inch thick.

Therefore, the transversal piercing member must not only engage the metal wall of the oil filter, typically $\frac{1}{32}$ to $\frac{1}{16}$ inch in thickness, but also the inner corrugated filter, so that the oil may drain from the inside of the oil filter through the punctured wall of the paper filter member, and then through outer metal wall of the filter into the boot itself.

When the oil filter is inserted within the boot, it snugly fits against one or more internal ledges of the boot to provide the space therebetween for drainage of fluid therefrom. The ledges extend perpendicular from an inside wall of the boot, into the interior of the boot.

The manual forces applied against the piercing members of the boot cause each piercing member to come engaged with the outer wall of the oil filter and then puncture same, thus providing a means for the excess oil therein to drain into the hollow portion of the boot below the ledge and out of the exit conduit therefrom.

The present invention provides a quick and easy engagement member for attaching on to an oil filter. Because of the location of the puncture means of the preferred embodiments, the user has the ability to choose to whether puncture the oil filter axially through the base, or transversally, if the axial end of the oil filter is inaccessible due to its being adjacent to and close to other engine parts. The oil can be drained while the oil filter is in place so that when it is removed it is substantially devoid of oil therefrom, which will prevent dripping and draining of the oil in inappropriate areas, such as on other engine parts or upon the ground.

DESCRIPTION OF THE DRAWINGS

FIG. 3 is a side sectional view in partial section of the boot showing an optional extension tube in an optional dual ratchet handle for engaging a plurality of puncture members at the base of the boot.

FIG. 4 is a side elevational view in partial section showing the puncture device in use.

DETAILED DESCRIPTION OF THE PREFERRED EMBODIMENT

Figure 1:
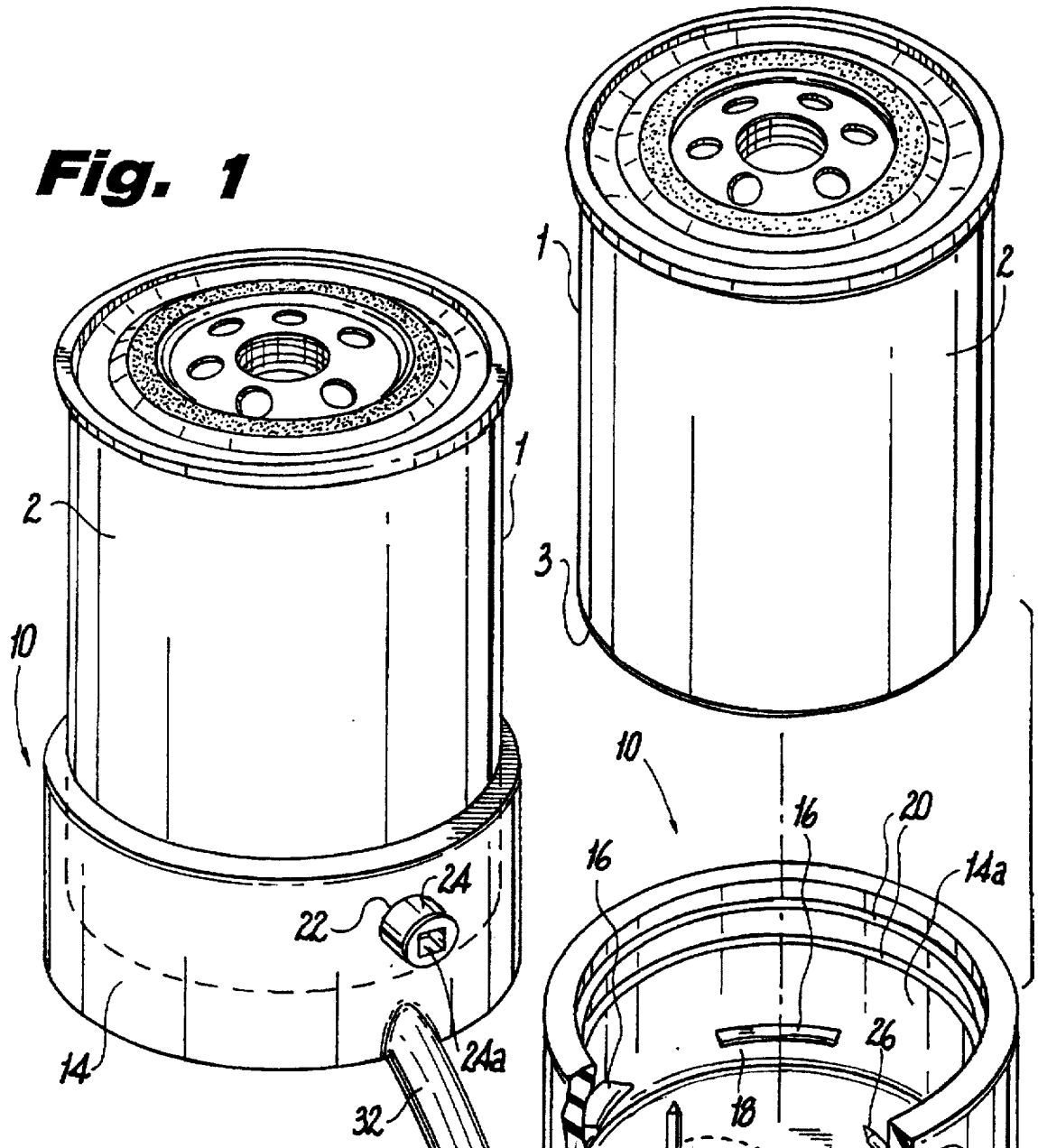
FIG. 1 is a perspective view of the boot of the present invention installed upon an oil filter.
Figure 2:
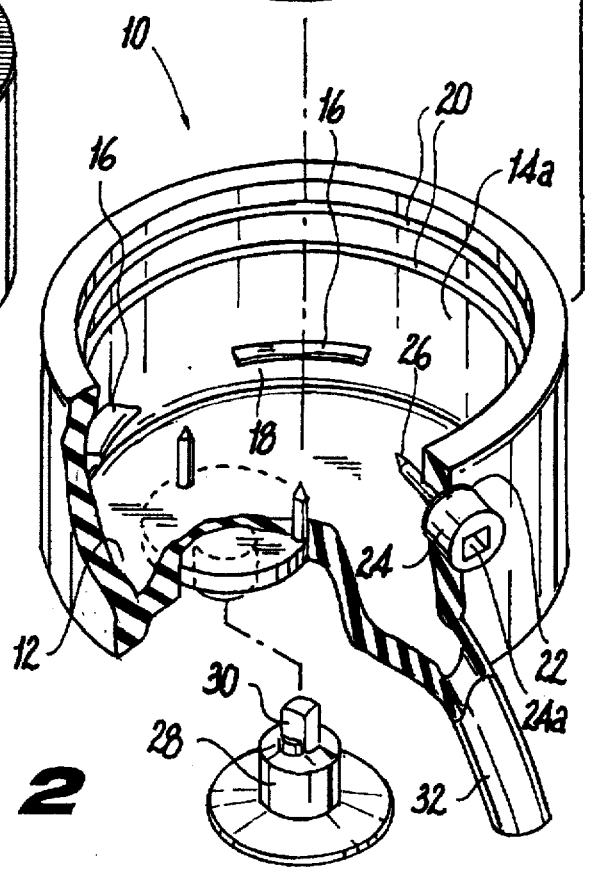
FIG. 2 is an exploded perspective view in partial cross section of the boot in relation to the oil filter.

The oil filter boot 10 for an oil filter 1 comprises an end base wall 12 and a hollow cylindrical wall 14. Ledge members 16 are provided within the interior of boot 10 at a lower portion thereof so that there is a cavity 18 provided under the ledge and above the lower end base wall 12. At least one inwardly extending annular griping member 20 is provided in an upper portion of the wall 14. The annular griping member 20 extend from the inside surface 14a of the cylindrical wall 14 of the boot 10.

The oil filter 1 includes an cylindrical wall 2 and a base member 3 and corrugated paper filter member 4 therein. The base member 3 engages the ledge wall 16 so that cavity 18 is provided within the boot between the bottom edge wall 3 of the oil filter and the lower base member 12 of the boot 10.

Inner paper filter 4 and exterior wall 2 are both penetrated by puncture member 22, having a hollow base member 24 and a sharp penetrating piercing member 26. Force is applied by a ratchet handle member 28 having a head portion 30 inserted within the hollow portion 24a of the penetration member 22.

To accelerate oil drainage, in a preferred embodiment there are more than one piercing member 26 insertable in the base wall 12 of the boot 10. At least one piercing member 26 may penetrate in the transversal cylindrical wall 2 of oil filter 1. The plurality of puncture members 26 pierce cylindrical wall 2 and base wall 3 of the oil filter at a plurality of places to assure proper drainage of the oil therefrom.

In the alternate embodiment, ratchet member 28 forces puncture member 122, which includes base 124 having a plurality of piercing members 26 extending therefrom for piercing oil filter 1 in more than one location simultaneously.

Moreover, when oil is drained into the cavity 18 of boot 10 underneath at least one ledge 16, it is ultimately drained out through conduit 32 which may be optionally attached to a further extension tube 34.

Other modifications may be made to the present invention without departing from the scope of the invention as noted in the appended claims.

I claim:

1. A vehicle oil filter puncture and drain member for a cylindrical vehicle oil filter having a cylindrical body and at least one base end wall, comprising:

a generally cylindrical hollow boot, said hollow boot having a cavity for insertion of an oil filter therein, at least one puncture member, for puncturing a hole in a wall of the oil filter to permit communication and drainage of oil through the hole into said hollow boot, said boot further having an outlet drainage conduit for drainage of oil therefrom, at least one ledge extending perpendicular from an interior wall of said cylindrical boot, said at least one ledge providing a stop means for said oil filter, said ledge providing a hollow drainage space between a base end wall of the oil filter and a bottom base wall of said boot.

2. The vehicle oil filter puncture and drain member as in claim 1, wherein said at least one puncture member includes a sharp piercing member engagable through a wall of the oil filter, said at least one puncture member selectively attached to at least one wall of said boot.

3. The vehicle oil filter puncture and drain member as in claim 2, wherein said at least one puncture member is located in a base end wall of said boot for axial puncturing of a base end wall of the oil filter.

4. The vehicle oil filter puncture and drain member as in claim 2, wherein said boot includes a plurality of puncture members.

5. The vehicle oil filter puncture and drain member as in claim 4, wherein said plurality of puncture members include at least one axial puncture member located in said base wall of said boot for axially puncturing the base of the oil filter, and at least one transversal puncture member for transversally puncturing a side of the cylindrical wall of the oil filter.

6. The vehicle oil filter puncture and drain member as in claim 1, wherein said at least one puncture member includes a base member having a plurality of piercing members for axially engaging the base end wall of the oil filter.

7. The vehicle oil filter puncture and drain member as in claim 1 further comprising:

an auxiliary optional extension member engagable over said outlet drainage conduit of said boot.

8. A vehicle oil filter puncture and drain member for a cylindrical vehicle oil filter having a cylindrical body and at least one base end wall, comprising:

a generally cylindrical hollow boot, said hollow boot having a cavity for insertion of an oil filter therein, at least one puncture member, for puncturing a hole in a wall of the oil filter to permit communication and drainage of oil through the hole into said hollow boot;

said boot further having an outlet drainage conduit for drainage of oil therefrom, wherein said at least one puncture member includes a sharp piercing member engagable through a wall of the oil filter, said at least one puncture member selectively attached to at least one wall of said boot, wherein further said at least one puncture member further comprises a hollow base member having an interior portion for insertion of a ratchet head therein for the application of force against said puncture member.

9. The vehicle oil filter puncture and drain member as in claim 8, wherein said at lease one puncture member is located in a base end wall of said boot for axial puncturing of a base end wall of the oil filter.

10. The vehicle oil filter puncture and drain member as in claim 8, wherein said boot includes a plurality of puncture members.

11. The vehicle oil filter puncture and drain member as in claim 10, wherein said plurality of puncture members include at least one axial puncture member located in said base wall of said boot for axially puncturing the base of the oil filter, and at least one transversal puncture member for transversally puncturing a side of the cylindrical wall of the oil filter.

12. The vehicle oil filter puncture and drain member as in claim 8, wherein said at least one puncture member includes a base member having a plurality of piercing members for axially engaging the base end wall of the oil filter.

13. The vehicle oil filter puncture and drain member as in claim 8, further comprising:

an auxiliary optional extension member engagable over said outlet drainage conduit of said boot.

14. A vehicle oil filter puncture and drain member for a cylindrical vehicle oil filter having a cylindrical body and at least one base end wall, comprising:

a generally cylindrical hollow boot, said hollow boot having a cavity for insertion of an oil filter therein, at least one puncture member, for puncturing a hole in a wall of the oil filter to permit communication and drainage of oil through the hole into said hollow boot, said boot further having an outlet drainage conduit for drainage of oil therefrom, at least one ledge extending perpendicular from an interior wall of said cylindrical boot, said at least one ledge providing a stop means for said oil filter, said ledge providing a hollow drainage space between a base end wall of the oil filter and a bottom base wall of said boot, wherein said at least one puncture member includes a sharp piercing member engagable through a wall of the oil filter, said at least one puncture member selectively attached to at least one wall of said boot, wherein further said at least one puncture member comprises a hollow base member having an interior portion for insertion of a ratchet head therein to the application of force against said puncture member.

15. The vehicle oil filter puncture and drain member as in claim 14, wherein said at least one puncture member is located in a base end wall of said boot for axial puncturing of a base end wall of the oil filter.

16. The vehicle oil filter puncture and drain member as in claim 14, wherein said boot includes a plurality of puncture members.

17. The vehicle oil filter puncture and drain member as in claim 16, wherein said plurality of puncture members include at least one axial puncture member located in said base wall of said boot for axially puncturing the base of the oil filter, and at least one transversal puncture member for transversally puncturing a side of the cylindrical wall of the oil filter.

18. The vehicle oil filter puncture and drain member as in claim 14, wherein said at least one puncture member includes a base member having a plurality of piercing members for axially engaging the base end wall of the oil filter.

19. The vehicle oil filter puncture and drain member as in claim 14 further comprising:

an auxiliary optional extension member engagable over said outlet drainage conduit of said boot.

* * * * *